United States Patent
Stair et al.

(10) Patent No.: US 8,248,058 B2
(45) Date of Patent: Aug. 21, 2012

(54) SIGNAL TESTING APPARATUS FOR LOAD CONTROL SYSTEM

(75) Inventors: Kenny J. Stair, North Prairie, WI (US); Brandon M. Batzler, Hartford, WI (US); Sie T. Lim, Jefferson, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 198 days.

(21) Appl. No.: 12/688,678

(22) Filed: Jan. 15, 2010

(65) Prior Publication Data

US 2011/0175597 A1    Jul. 21, 2011

(51) Int. Cl.
*G01R 19/14* (2006.01)
(52) U.S. Cl. .................... 324/133; 324/113; 324/508
(58) Field of Classification Search .............. None
See application file for complete search history.

(56) References Cited

U.S. PATENT DOCUMENTS

| | | | |
|---|---|---|---|
| 3,821,639 A * | 6/1974 | De Langis | 324/508 |
| 4,164,702 A * | 8/1979 | Pereda | 324/508 |
| 4,403,292 A | 9/1983 | Ejzak et al. | |
| 4,556,882 A | 12/1985 | Brifman et al. | |
| 5,301,083 A | 4/1994 | Grass et al. | |
| 5,373,411 A | 12/1994 | Grass et al. | |
| 5,536,976 A | 7/1996 | Churchill | |
| 5,982,098 A | 11/1999 | Redgate | |
| 6,084,758 A | 7/2000 | Clarey et al. | |
| 6,172,432 B1 | 1/2001 | Schnackenberg et al. | |
| 6,181,985 B1 | 1/2001 | O'Donnell et al. | |
| 6,191,500 B1 | 2/2001 | Toy | |
| 6,215,202 B1 | 4/2001 | Luongo et al. | |
| 6,285,178 B1 | 9/2001 | Ball et al. | |
| 6,356,426 B1 | 3/2002 | Dougherty | |
| 6,392,368 B1 | 5/2002 | Deller et al. | |
| 6,657,416 B2 | 12/2003 | Kern et al. | |
| 6,747,368 B2 | 6/2004 | Jarrett, Jr. | |
| 6,842,668 B2 | 1/2005 | Carson et al. | |
| 6,891,478 B2 | 5/2005 | Gardner | |
| 6,949,843 B2 | 9/2005 | Dubovsky | |
| 6,971,399 B2 | 12/2005 | Cowan | |
| 7,005,760 B2 | 2/2006 | Eaton et al. | |
| 7,015,599 B2 | 3/2006 | Gull et al. | |
| 119,457 A1 | 10/2006 | Flegel | |
| 7,129,822 B2 * | 10/2006 | Finan et al. | 340/12.32 |
| 7,132,951 B2 | 11/2006 | Ziejewski et al. | |
| 7,142,950 B2 | 11/2006 | Rasmussen et al. | |
| 7,262,694 B2 | 8/2007 | Olsen et al. | |
| 7,274,974 B2 | 9/2007 | Brown et al. | |
| 7,307,360 B2 * | 12/2007 | Gonzales et al. | 307/64 |
| 7,356,384 B2 | 4/2008 | Gull et al. | |
| 7,418,314 B2 | 8/2008 | Rasmussen et al. | |

(Continued)

*Primary Examiner* — Richard Isla Rodas
(74) *Attorney, Agent, or Firm* — Foley & Lardner LLP

(57) ABSTRACT

A system for testing power line carrier signal integrity or strength in a building electrical system includes a transmitter module electrically coupled to a first electrical outlet and configured to transmit a power line carrier signal over the building electrical system. The system also includes a receiver module electrically coupled to a second electrical outlet and configured to receive the power line carrier signal from the transmitter module. The receiver module includes circuitry configured to determine whether at least one of the integrity and strength of the power line carrier signal is sufficient for a load control system installed in the building electrical system to communicate with relay modules installed in the building electrical system using power line carrier signals. The receiver module includes a user interface configured to provide an indication of at least one of the integrity and strength of the power line carrier signal.

19 Claims, 5 Drawing Sheets

U.S. PATENT DOCUMENTS

| | | |
|---|---|---|
| 7,599,171 B1 | 10/2009 | Remmert |
| 7,605,594 B2 * | 10/2009 | Blades ........................ 324/713 |
| 7,683,603 B1 * | 3/2010 | Lathrop et al. ............... 324/110 |
| 8,018,219 B2 * | 9/2011 | Calcaterra et al. ............. 324/66 |
| 2003/0075982 A1 | 4/2003 | Seefeldt |
| 2004/0075343 A1 | 4/2004 | Wareham et al. |
| 2004/0079626 A1 | 4/2004 | Haq |
| 2005/0116814 A1 | 6/2005 | Rodgers et al. |
| 2006/0109599 A1 | 5/2006 | Holley |
| 2007/0010916 A1 * | 1/2007 | Rodgers et al. ............... 700/295 |
| 2008/0172312 A1 | 7/2008 | Synesiou et al. |
| 2008/0313006 A1 | 12/2008 | Witter et al. |
| 2009/0225501 A1 | 9/2009 | Luebke et al. |
| 2010/0315092 A1 * | 12/2010 | Nacson et al. ................ 324/510 |

* cited by examiner

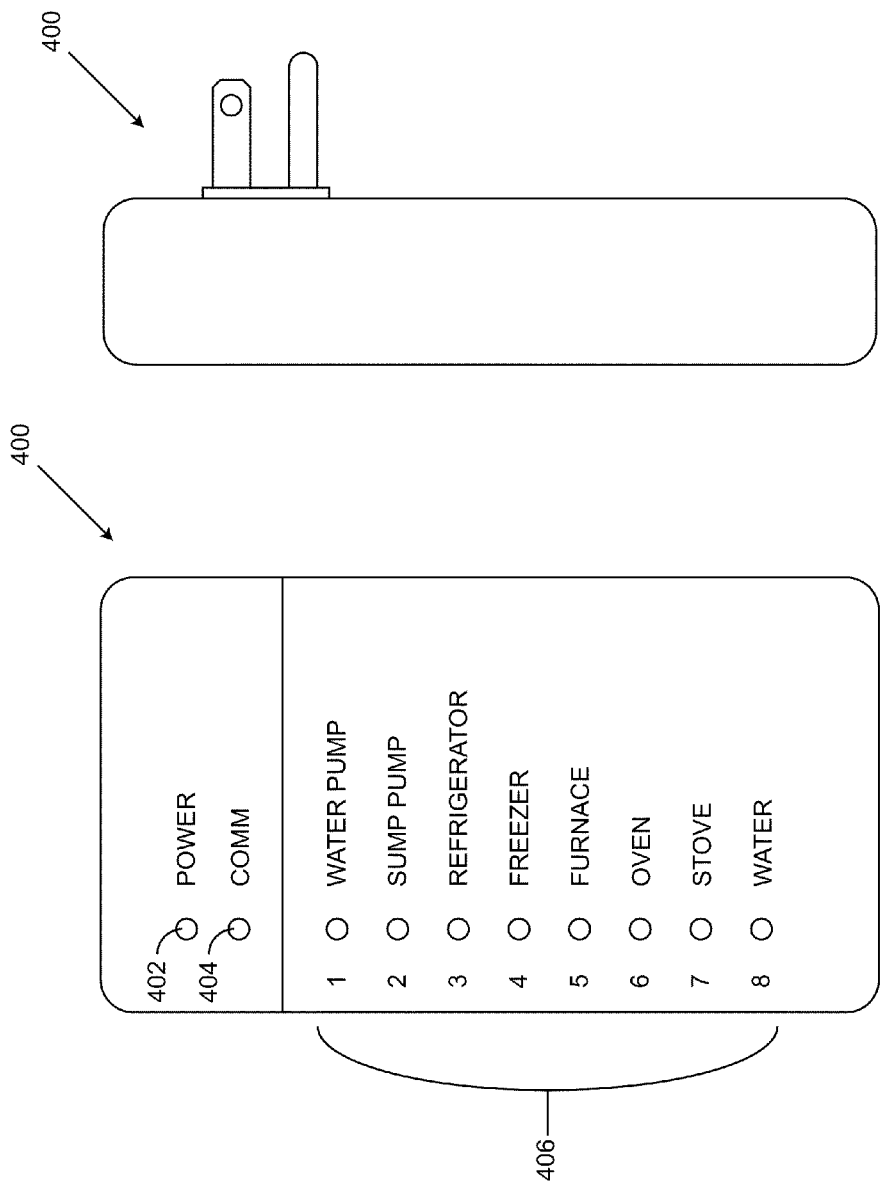

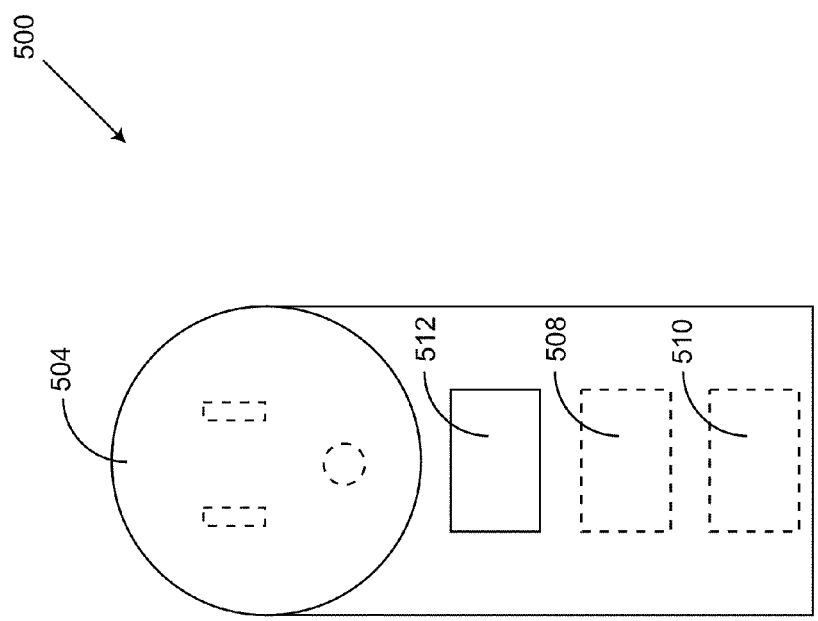
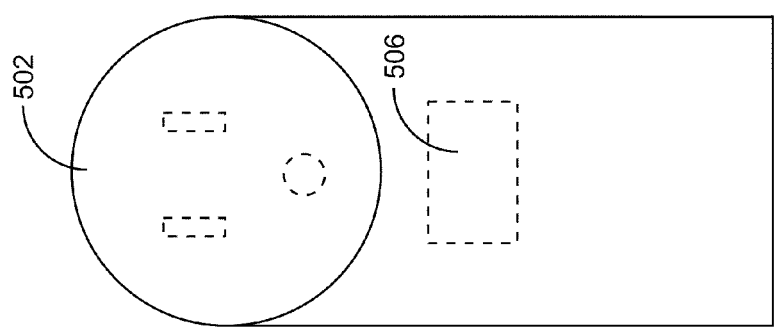
FIG. 5B
FIG. 5A

SIGNAL TESTING APPARATUS FOR LOAD CONTROL SYSTEM

BACKGROUND

The present disclosure relates generally to the field of building electrical systems and more specifically to building electrical systems including utility power sources and standby power sources. Standby power systems are generally configured to provide backup power to electrical loads in the event of a utility power failure. A control system may selectively provide power to electrical loads when using standby power.

SUMMARY

One embodiment of the invention relates to a system for testing power line carrier signal integrity or strength in a building electrical system. The system includes a transmitter module electrically coupled to a first electrical outlet and configured to transmit a power line carrier signal over the building electrical system. The system also includes a receiver module electrically coupled to a second electrical outlet and configured to receive the power line carrier signal from the transmitter module. The receiver module includes circuitry configured to determine whether at least one of the integrity and strength of the power line carrier signal is sufficient for a load control system installed in the building electrical system to communicate with relay modules installed in the building electrical system using power line carrier signals. The receiver module includes a user interface configured to provide an indication of at least one of the integrity and strength of the power line carrier signal.

Another embodiment of the invention relates to a method for testing power line carrier signal integrity or strength in a building electrical system. The method includes electrically coupling a transmitter module electrically to a first electrical outlet, transmitting a power line carrier signal over the building electrical system using the transmitter module, electrically coupling a receiver module to a second electrical outlet, receiving the power line carrier signal at the receiver module and from the transmitter module, using the receiver module to determine whether the integrity or strength of the power line carrier signal is sufficient for a load control system installed in the building electrical system to communicate with relay modules installed in the building electrical system using power line carrier signals, and providing an indication of at least one of the integrity and strength of the power line carrier signal on a user interface of the receiver module.

Another embodiment of the invention relates to a system for testing the effectiveness of power line carrier communication of a load control system. The system includes a transmitter module electrically coupled to a first electrical outlet and configured to transmit a power line carrier signal over the building electrical system. The system also includes a receiver module electrically coupled to a second electrical outlet and configured to receive the power line carrier signal from the transmitter module. The receiver module includes circuitry configured to determine whether the load control system would accurately communicate with relay modules installed in the building electrical system using power line carrier signals. The receiver module includes a user interface configured to provide an indication of the determination.

Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, wherein like reference numerals refer to like elements, in which:

FIGS. 4A and 4B are schematic diagrams illustrating a load monitoring device for a load control system, according to an exemplary embodiment.

FIGS. 5A and 5B are schematic diagrams illustrating signal integrity or strength monitoring devices for a load control system, according to an exemplary embodiment.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
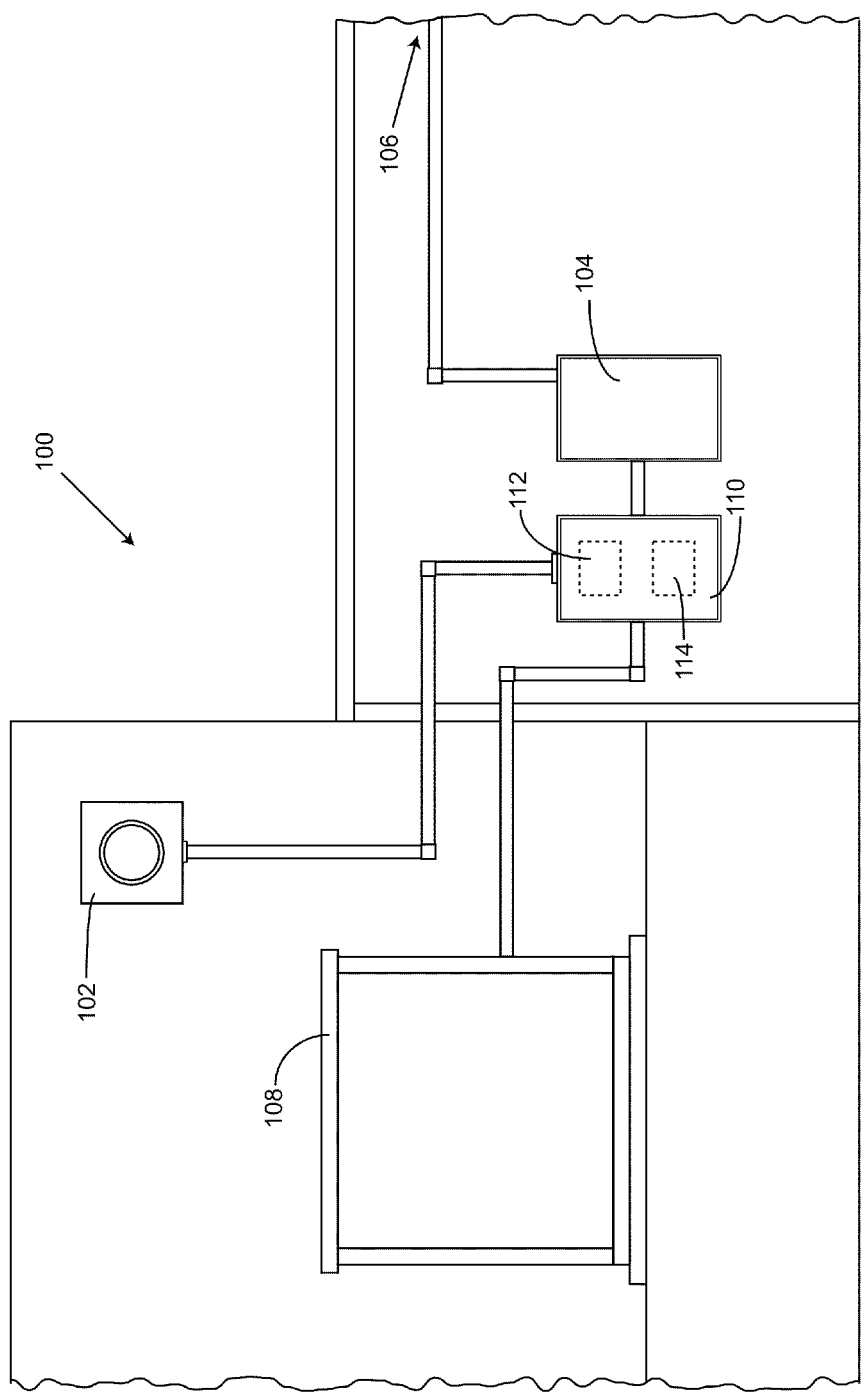
FIG. 1 is a schematic diagram illustrating a building electrical system, according to an exemplary embodiment.

FIG. 1 illustrates an electrical system 100 for a building (e.g., a home electrical system) according to an exemplary embodiment. Electrical system 100 includes an electric utility module 102 (e.g., including an electric meter) electrically coupled to an off-site utility power source (not shown) and configured to provide power from the off-site utility source to a distribution or breaker panel 104. Distribution panel 104 (e.g., a circuit breaker box, a fuse box, etc.) is configured to route electrical power to electrical loads 106 (not specifically shown in FIG. 1) in the building. Electrical system 100 also includes a generator 108 (e.g. a home standby generator) for providing electrical power to distribution panel 104 instead of or in addition to the utility power provided at module 102. For example, generator 108 may be configured to provide power to distribution panel 104 in the event of a utility power failure. According to various exemplary embodiments, generator 108 may be a home standby generator, a portable generator, or any generator capable of providing power to a distribution panel of a building.

Electrical system 100 also includes a load control system 110 that is electrically coupled to distribution panel 104, module 102, and generator 108. Load control system 110 is configured to provide one of utility power from module 102 and generator power from generator 108 to distribution panel 104. When generator 108 power is used, load control system 110 is configured to manage high power loads and shed various high power loads when the load on generator 108 reaches a predefined threshold (depending on the size of the generator). A single or multiple load shed may occur depending on the load on generator 108.

Load control system 110 is also configured to add high power loads if the load on generator 108 returns to a value lower than the predefined threshold (depending on the size of the generator). For example, generator 108 may have more power available if a load, such as an air conditioner, switches off. Once a load is shed, there is a delay (e.g., about 5 minutes) before the load may be added again.

Load control system 110 may be generally configured to shed and add loads based on a priority of the loads. A load with a high priority may be one of the last loads shed and one of the first loads added when using generator 108 power. For example, during cold weather, a furnace may have a high priority and be the last load shed or not shed at all. A refrigerator may have a high priority (e.g., only below a furnace in cold weather or an air conditioner in hot weather) and be one of the last to shed and one of the first to be added again if the generator provides sufficient power.

Load control system 110 includes an automatic transfer switch 112 and a controller 114. According to various exemplary embodiments, automatic transfer switch 112 may be any electronically actuated transfer switch that is capable of switching between power from utility module 102 and generator 108. Controller 114 may be any hardware or software module configured to manage the loads when generator power is provided, as described above. In some exemplary embodiments, controller 114 may include a separate controller configured to manage an air conditioner, furnace, or heating system.

Figure 2:
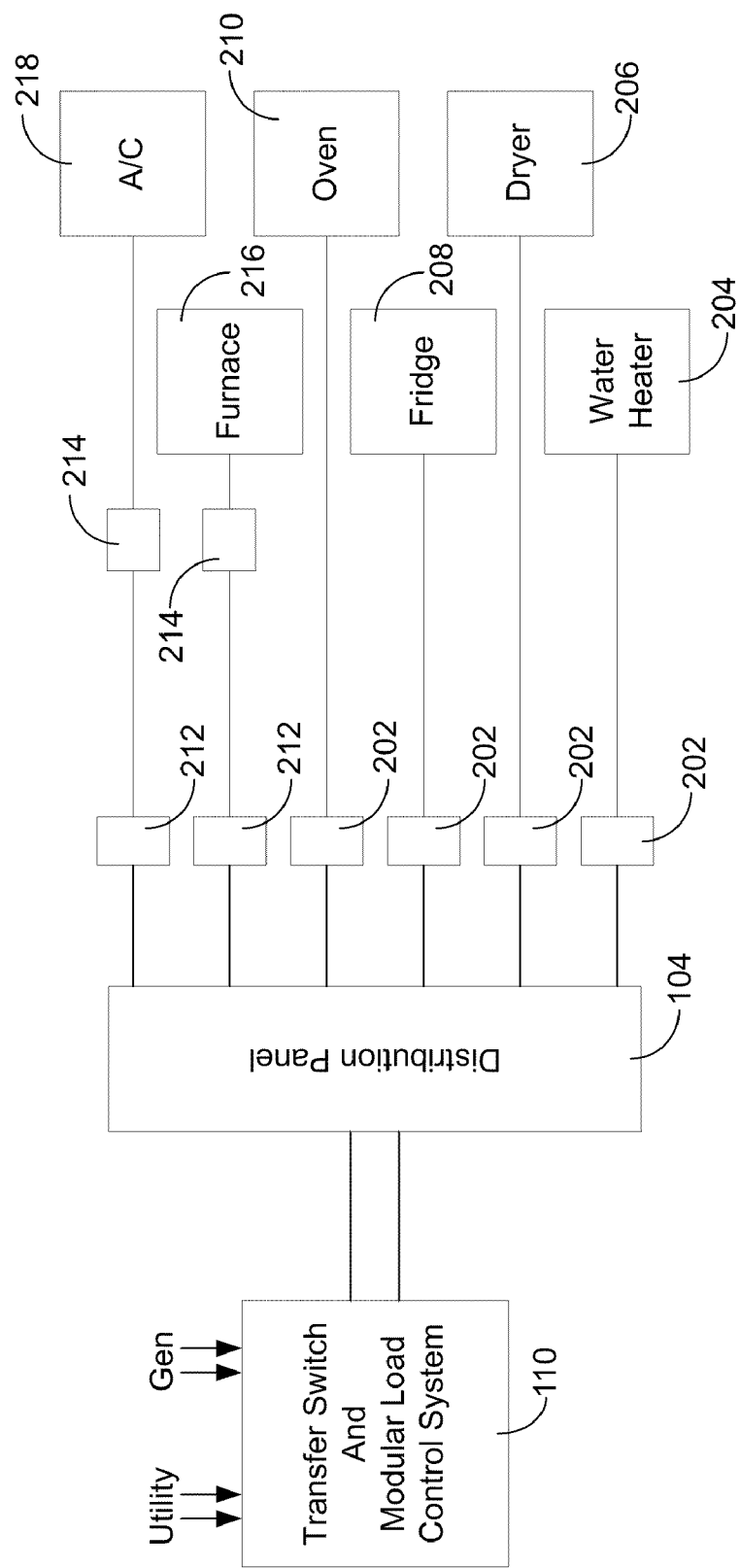
FIG. 2 is a block diagram illustrating a load control system for a building electrical system, according to an exemplary embodiment.

Referring to FIG. 2, load control system 110 is configured to manage multiple relay modules that are electrically coupled to various loads, according to one exemplary embodiment. One or more relay modules 202 are electrically coupled between distribution panel 104 and various high power loads, for example a water heater 204, a clothes dryer 206, a refrigerator 208, an oven 210, etc. The remote relay modules 202 are configured to electrically couple a respective high power load to distribution panel 104 or to disconnect it from distribution panel 104. Load control system 110 may communicate with each relay module 202 via power line carrier (PLC) technology. According to other exemplary embodiments, more or fewer high power loads and relay modules 202 may be used. Other high power loads may include a microwave, a computer, a television, a garage door opener, or any 115V, 120V, 220V, or 240V electrical outlet. According to one exemplary embodiment, relay modules 202 may include hardwired contactor modules that are configured to operate up to 50 Amp and 240 VAC loads. The contactor modules may include relays or switches that activate or deactivate based on a control signal from load control system 110. The contactor modules may also include a full-wave rectifier for providing a 110 VDC coil supply voltage to the relay or switch. Relay modules 202 may receive power from a 15 Amp, 120 VAC circuit of distribution panel 104 (e.g., a 120V electrical outlet). According to other exemplary embodiments, relay modules 202 may be configured to operate greater than 50 Amp loads at 240 VAC or other voltages. According to other exemplary embodiments, relay modules 202 may receive power from circuits having other amperages and voltages than 15 Amps and 120 VAC. According to various other exemplary embodiments, relay modules 202 may include other types of appropriate relays or switches.

One or more relay modules 212 are electrically coupled between distribution panel 104 and various low power loads, for example a thermostat 214 configured to control switching of a furnace 216, an air conditioning system 218, or another heating or ventilation system. The remote relay modules 212 are configured to electrically control thermostat 214 in order to control the operation of furnace 216 or air conditioner 218. Load control system 110 may communicate with each relay module 212 via power line carrier (PLC) technology. PLC technology is a system for carrying data on wiring that is also used for electric power transmission. According to other exemplary embodiments, more or fewer low power loads and relay modules 212 may be used. According to one exemplary embodiment, relay modules 212 may include a relay that is configured to control up to 24 VAC loads (e.g., a thermostat). Relay modules 212 may receive power from a 5 Amp, 120 VAC circuit of distribution panel 104 (e.g., a 120V electrical outlet). According to other exemplary embodiments, relay modules 212 may be configured to operate loads at voltages other than 24 VAC. According to other exemplary embodiments, relay modules 212 may receive power from circuits having other amperages and voltages than 5 Amps and 120 VAC. According to various other exemplary embodiments, relay modules 212 may include other types of appropriate relays or switches.

It is noted that while a load control system including modular relays for each load is illustrated, according to alternative exemplary embodiments, the electrical system may include a single load control center downstream of the distribution panel. Alternatively, load control system 110 may directly control a portion of the loads (e.g., the heating and air conditioning systems). The various configurations are intended to provide an opportunity to choose the best system for the individual homeowner or consumer and provide a power management system of an appropriate size for whole house power.

Figure 3:
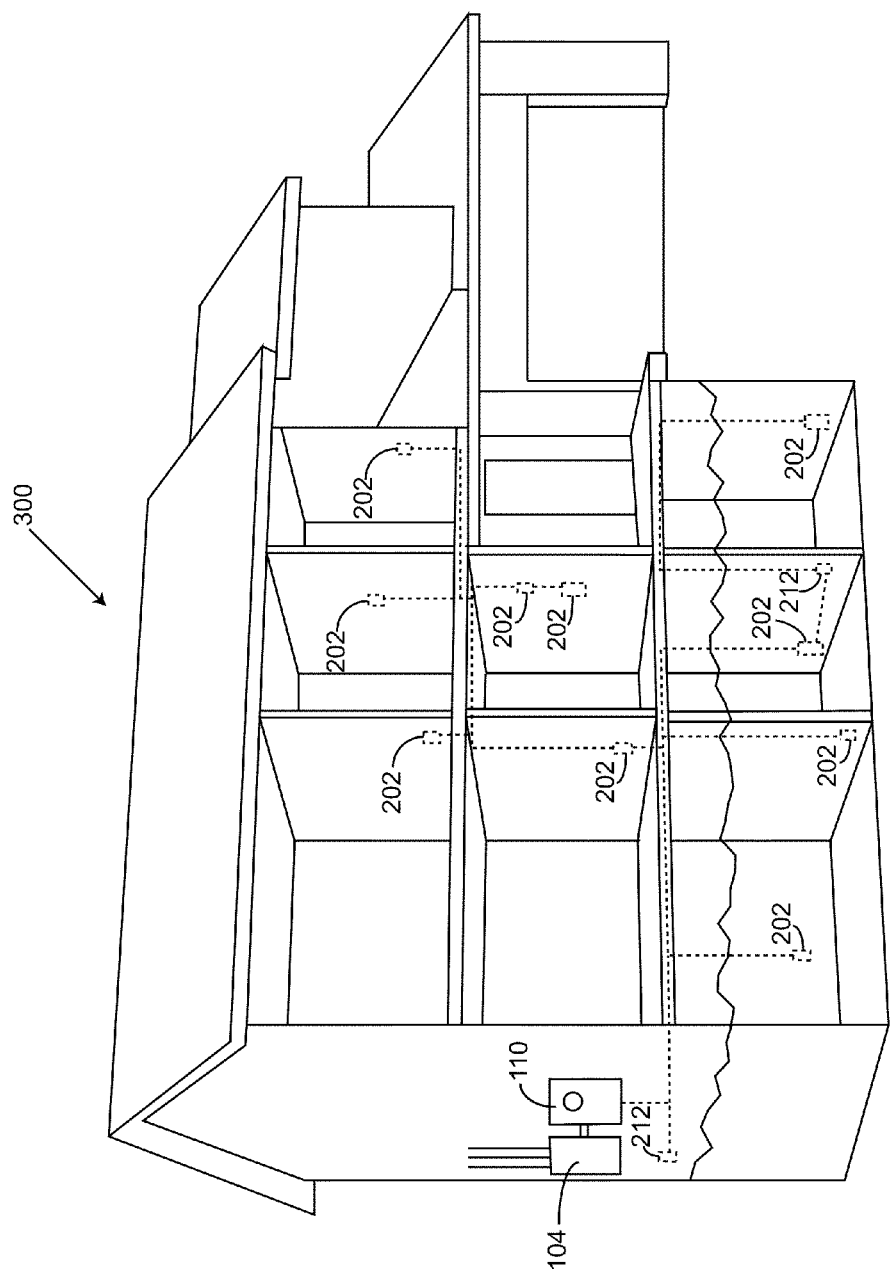
FIG. 3 is a schematic diagram illustrating a load control system for a building electrical system, according to an exemplary embodiment.

Referring to FIG. 3, a building electrical system 300 includes load management system 110, multiple relay modules 202 and multiple relay modules 212. Modules 202 and 212 may be installed in-line to or using existing wiring. For example, each module 202 may be installed into an existing electrical outlet or wherever is most convenient. Use of existing wiring is intended to allow for efficient installation. Modules 202 and 212 need not be located near automatic transfer switch 112 of load control system 110 because the PLC control allows for communication over the building power lines. Usage of modules 202 and 212 may be flexible and expandable so that additional modules can be efficiently added or existing modules can be efficiently removed. Additionally, modules 202 and 212 may be efficiently replaced if a module malfunctions.

Each module 202 or 212 may be controlled by load control system 110 in a custom priority sequence. When generator 108 power is used, control system 110 sends PLC control signals to each module 202 and 212 over the existing power lines. Control system 110 commands each module 202 and 212 to provide power to or to disconnect the respective load depending on the amount of generator 108 power available, the amount of power the respective load would consume, and the priority of the load. Each module 202 and 212 may receive all of the control signals sent by control system 110 and thus load control system 110 may be configured to send a unique identifier so that each module 202 or 212 can identify what control signal, if any, to use. Each module 202 or 212 may include a user interface (e.g., a switch, a pushbutton, a lever, etc.) configured to select the priority of the particular module 202 or 212. The module 202 or 212 may send a control signal to control system 110 in response to actuation of the user interface to adjust the priority sequence of loads 106. Building electrical system 300 may include a monitoring device configured to provide the homeowner with a status of each managed load.

Referring to FIGS. 4A and 4B, a monitoring device 400 is configured to provide the homeowner with a status of each managed load, according to an exemplary embodiment. Because load control system 110 communicates with each module 202 and 212 over existing power lines using PLC technology, each electrical outlet receives the communication signals sent by load control system 110. Monitoring device 400 may thus be coupled to or plugged in to any home electrical outlet to monitor the status of the managed loads. Monitoring device 400 includes indicators 402 and 404 (e.g., LED's, indicators on an LCD display, etc.) that are configured to provide a visual indication as to whether power and communication have been received by device 400. Monitoring device 400 also includes multiple indicators 406 that are configured to provide a visual indication of what loads are receiving power from generator 108. The names and priority of each load identified by device 400 may be set by the homeowner, for example, by using adhesive labels, a reconfigurable display, etc.

Referring to FIGS. 5A and 5B, a building electrical system that does not have load control system 110 installed may be tested to see whether the electrical system is appropriate for installation of load control system 110, according to an exemplary embodiment. Because load control system 110 uses PLC technology, there may be electrical interference when installed in certain buildings due to signal attenuation, noise in the system, etc., for example as may be caused by a fluorescent light or other circuit. Such interference may cause load control system 110 to communicate incorrectly with modules 202 and 212 and to incorrectly shed or add loads.

A testing system 500 may be coupled (e.g., plugged in) to electrical outlets in the building to allow dealers/installers to verify if there is potential interference or noise in the electrical system that may affect operation of load control system 110 before actual installation of load control system 110. Testing system 500 visually indicates if there are any issues with the electrical system. By knowing any issues ahead of time, the installer may request assistance or may be able to isolate interfering circuits and inform the homeowner of any potential that load manager 110 may not work with the circuit in place. This information is intended to aid the homeowner in the decision of whether to remove the circuit, replace the component in the circuit that is causing the issue, or use another load control system that does not use PLC technology.

Referring specifically to FIG. 5A, testing system 500 includes a transmitter module 502 and a receiver module 504. Transmitter module 502 is configured for coupling to an electrical outlet (e.g., 115V, 120V, 220V, or 240V), for example at one end of the building electrical system such as at distribution panel 104. Transmitter module 502 is powered by the electrical outlet and includes a transmitter circuit 506 that is configured to send a communication signal using a PLC technology protocol similar to the protocol used by load control system 110. The strength of the signal sent by transmitter circuit 506 may be at least slightly reduced compared to the signals sent by load control system 110. Transmitter module 502 may include a user interface (e.g., an LED, an LCD display, an audio output, etc.) to indicate that transmitter module is receiving power from the electrical outlet.

Referring specifically to FIG. 5B, receiver module 504 is configured for coupling to an electrical outlet (e.g., 115V, 120V, 220V, or 240V) at a different location of the building electrical system than transmitter module 502. Receiver module 504 is powered by the electrical outlet and includes a receiver circuit 508 configured to receive the PLC signal sent by transmitter module 502. Receiver module 504 also includes circuitry 510 configured to determine if the signal integrity and strength is at an appropriate level or is sufficient for proper use by load control system 110. According to various exemplary embodiments, circuitry 510 may be any analog or digital circuitry capable of determining signal integrity and strength or may be a software routine executed on hardware. According to other exemplary embodiments, circuitry 510 and receiver circuit 508 may be integrated into a single circuit.

Receiver module 504 also includes a user interface 512 configured to visually indicate the signal integrity and/or strength. According to some exemplary embodiments, user interface 512 may include multiple LEDs including green, orange, and red LEDs. A green indicator means that signal integrity and/or strength is good, an orange indicator means there is a possible issue, and a red indicator means that signal integrity and/or strength is too poor for load control system 110 to work. User interface 512 may also include an indicator identifying whether there is power to the receiver module 504. According to other exemplary embodiments, user interface 512 may include a single LED capable of providing different colored indications. According to still other exemplary embodiments, user interface 512 may include a display (e.g., an LCD display) capable of displaying signal integrity and/or strength information via color indications, text, or graphical indications. According to further exemplary embodiments, user interface 512 may provide audio output to indicate signal integrity or strength.

Preferably, receiver module 504 may be electrically coupled to an electrical circuit located as far away from transmitter module 502 as possible in order to consider all possible interfering circuits in the electrical system. However, receiver module 504 may be electrically coupled to any electrical outlet in the building in order to isolate any interfering circuits. Breaker switches may be actuated to turn specific circuits off in order to determine if a particular circuit is in fact causing interference.

According to other exemplary embodiments, transmitter module 502 and receiver module 504 may include the same circuitry and include a transceiver circuit instead of receiver circuit 508 and transmitter circuit 506. The transceiver module may selectively transmit or receive PLC signals, for example using a switch, while disabling the unused transmit or receive function.

While the exemplary embodiments illustrated in the figures and described herein are presently preferred, it should be understood that these embodiments are offered by way of example only. Accordingly, the present application is not limited to a particular embodiment, but extends to various modifications. The order or sequence of any processes or method steps may be varied or re-sequenced according to alternative embodiments.

According to various exemplary embodiments, the controller and circuitry described herein may be embodied as software, computer program products, or machine instructions on any machine-readable media. Alternatively, the controller or circuitry may be implemented using computer processors or logic controllers capable of performing the functions described above or may be implemented as a hardwired system.

The construction and arrangement of the electrical system and the testing system shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter. For example, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments without departing from the scope of the present application.

As noted above, embodiments within the scope of the present application include software, computer program products, or machine instructions comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

What is claimed is:

1. A system for testing power line carrier signal integrity or strength in a building electrical system prior to installation of a load control system, comprising:
    a transmitter module electrically coupled to a first electrical outlet at a first location of the building electrical system and configured to transmit a power line carrier signal over the building electrical system; and
    a receiver module electrically coupled to a second electrical outlet at a second location of the building electrical system that is different than the first location, the receiver module being configured to receive the power line carrier signal from the transmitter module, the receiver module comprising circuitry that measures at least one of the integrity and strength of the received power line carrier signal and determines, based on the at least one of the integrity and strength of the received power line carrier signal, whether the building electrical system in its current condition would enable the load control system to communicate with relay modules using power line carrier signals if the load control system and relay modules were installed in the building electrical system, the receiver module comprising a user interface configured to provide an indication of whether the building electrical system in its current condition would enable communication between the load control system and relay modules if the load control system and relay modules were installed in the building electrical system.

2. The system of claim 1, wherein the user interface provides a visual indication if the integrity and strength of the power line carrier signal is sufficient for communication by the load control system.

3. The system of claim 1, wherein the user interface provides a visual indication if at least one of the integrity and strength of the power line carrier signal is not sufficient for communication by the load control system.

4. The system of claim 1, wherein the user interface provides a visual indication if at least one of the integrity and strength of the power line carrier signal is not desirable for communication by the load control system.

5. The system of claim 1, wherein the user interface provides a visual indication if the integrity or strength of the power line carrier signal is sufficient for communication by the load control system, if the integrity or strength of the power line carrier signal is not sufficient for communication by the load control system, and if the integrity or strength of the power line carrier signal is not desirable for communication by the load control system.

6. The system of claim 1, further comprising a second receiver module electrically coupled to a third electrical outlet to isolate a circuit generating noise or signal attenuation in the building electrical system.

7. A method for testing power line carrier signal integrity or strength in a building electrical system, comprising:
    electrically coupling a transmitter module to a first electrical outlet;
    transmitting a power line carrier signal over the building electrical system using the transmitter module;
    electrically coupling a receiver module to a second electrical outlet;
    receiving the power line carrier signal at the receiver module from the transmitter module;
    using the receiver module to determine whether at least one of the integrity and strength of the power line carrier signal is sufficient for a load control system installed in the building electrical system to communicate with relay modules installed in the building electrical system using power line carrier signals; and
    providing an indication of the at least one of integrity and strength of the power line carrier signal on a user interface of the receiver module.

8. The method of claim 7, wherein the user interface provides a visual indication if the integrity and strength of the power line carrier signal is sufficient for communication by the load control system.

9. The method of claim 7, wherein the user interface provides a visual indication if at least one of the integrity and strength of the power line carrier signal is not sufficient for communication by the load control system.

10. The method of claim 7, wherein the user interface provides a visual indication if at least one of the integrity and strength of the power line carrier signal is not desirable for communication by the load control system.

11. The method of claim 7, wherein the user interface provides a visual indication if the integrity or strength of the power line carrier signal is sufficient for communication by the load control system, if the integrity or strength of the power line carrier signal is not sufficient for communication by the load control system, and if the integrity or strength of the power line carrier signal is not desirable for communication by the load control system.

12. The method of claim 7, further comprising electrically coupling the receiver module to a third electrical outlet to isolate a circuit generating noise or signal attenuation in the building electrical system.

13. The method of claim 7, further comprising decoupling an electrical circuit from the building electrical system to isolate a circuit generating noise or signal attenuation in the building electrical system.

14. A system for testing the effectiveness of power line carrier communication of a load control system, comprising:
   a transmitter module electrically coupled to a first electrical outlet at a first location of a building electrical system and configured to transmit a power line carrier signal over the building electrical system prior to installation of a load control system; and
   a receiver module electrically coupled to a second electrical outlet at a second location of the building electrical system that is different than the first location, the receiver module, the receiver module comprising circuitry that measures at least one of an integrity and a strength of the power line carrier signal and determines whether the building electrical system in its current condition would enable the load control system to communicate with relay modules using power line carrier signals if the load control system and relay modules were installed in the building electrical system, based on at least one of the integrity and strength of the power line carrier signal, the receiver module comprising a user interface configured to provide an indication of the determination.

15. The system of claim 14, wherein the user interface provides a visual indication if the integrity and strength of the power line carrier signal is sufficient for communication by the load control system.

16. The system of claim 14, wherein the user interface provides a visual indication if at least one of the integrity and strength of the power line carrier signal is not sufficient for communication by the load control system.

17. The system of claim 14, wherein the user interface provides a visual indication if at least one of the integrity and strength of the power line carrier signal is not desirable for communication by the load control system.

18. The system of claim 14, wherein the user interface provides a visual indication if the integrity or strength of the power line carrier signal is sufficient for communication by the load control system, if the integrity or strength of the power line carrier signal is not sufficient for communication by the load control system, and if the integrity or strength of the power line carrier signal is not desirable for communication by the load control system.

19. The system of claim 14, further comprising a second receiver module electrically coupled to a third electrical outlet to isolate a circuit generating noise or signal attenuation in the building electrical system.

* * * * *